Dec. 2, 1952 P. D. MOORE ET AL 2,619,868
DEVICE FOR TEACHING TIME AND RHYTHM
Filed July 17, 1950 2 SHEETS—SHEET 1
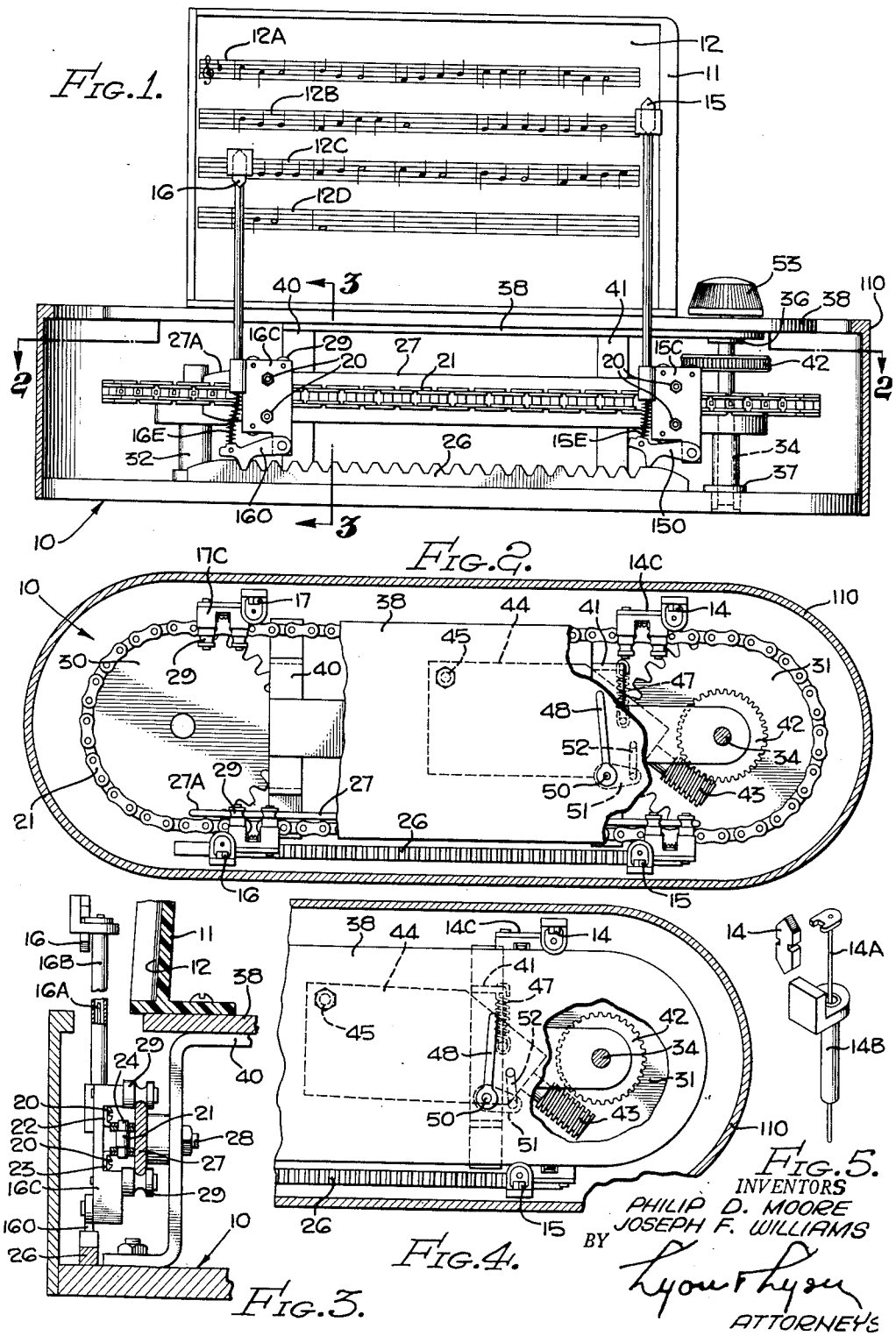

Dec. 2, 1952     P. D. MOORE ET AL     2,619,868
DEVICE FOR TEACHING TIME AND RHYTHM
Filed July 17, 1950     2 SHEETS—SHEET 2
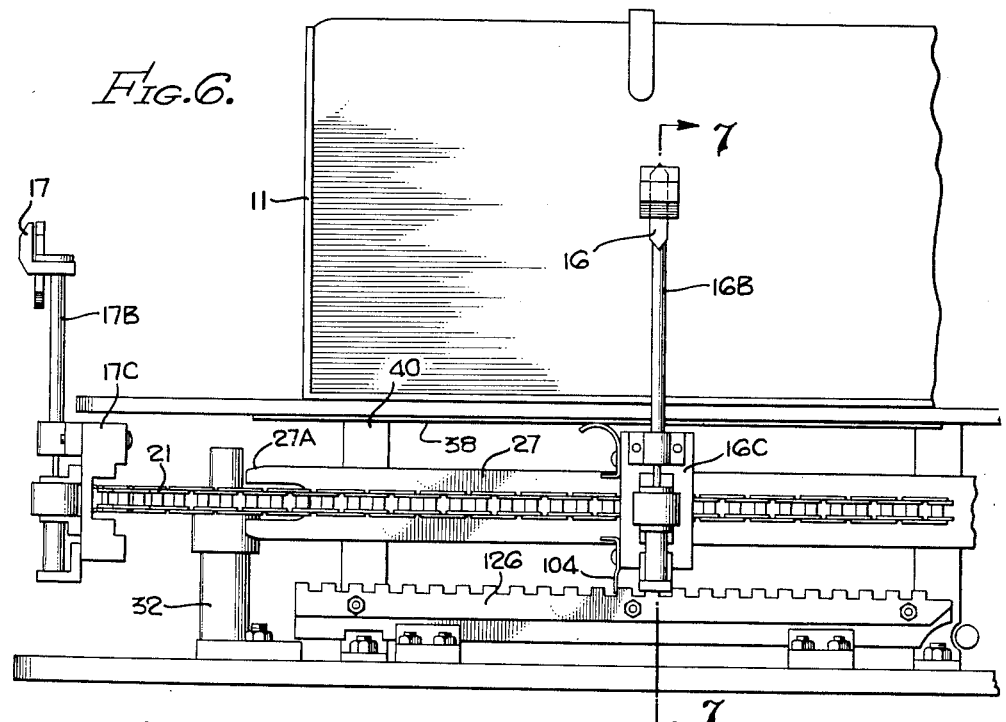
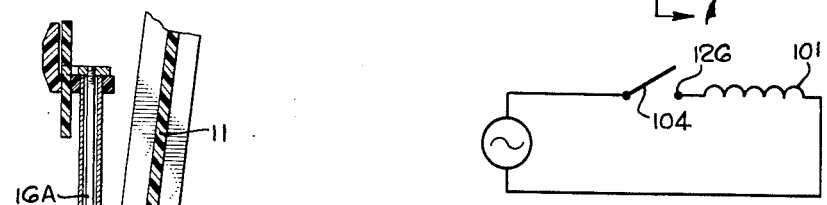
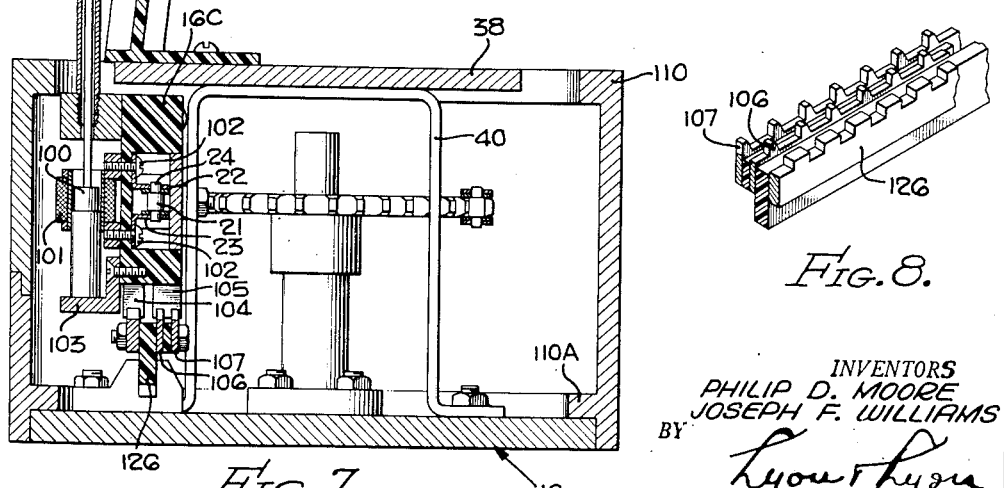
INVENTORS
PHILIP D. MOORE
JOSEPH F. WILLIAMS
BY
ATTORNEYS Patented Dec. 2, 1952

2,619,868

UNITED STATES PATENT OFFICE 2,619,868

DEVICE FOR TEACHING TIME AND RHYTHM

Philip D. Moore and Joseph F. Williams,
Huntington Park, Calif.

Application July 17, 1950, Serial No. 174,252

9 Claims. (Cl. 84—484)

1

The present invention relates to apparatus for teaching rhythm and timing in the study of music.

The apparatus shown and described herein features a pointer which is moved relative to lines of printed music and is simultaneously bobbed up and down in timed relationship to realistically portray the up and down beats of music being scanned by the pointer. One species of this apparatus as shown herein incorporates a solenoid actuated mechanism to produce the bobbing, such solenoid actuated mechanism, upon operation, producing an audible sound simulating the sound produced by conventional metronomes.

It is therefore an object of the present invention to provide an improved apparatus of this character wherein a pointer moved relative to printed music for scanning the same, simultaneously bobs to indicate the beats.

Another object of the present invention is to provide an improved apparatus of this character which emits an audible sound to indicate audibly the beats.

Another object of the present invention is to provide a new device for teaching time in music so as to produce an effect whereby the pupil may perceive the instant to begin each note and the instant to leave off and begin the next note.

Another object of the present invention is to provide an improved device of this character arranged to correctly indicate not only when each note is to be played but also the length of time during which the notes of various values are to be sounded.

Another object of the present invention is to provide an improved device of the character mentioned in the preceding paragraph characterized by the fact that the information is imparted through the sense of seeing as well as hearing.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in front elevation of apparatus embodying features of the present invention but with the encircling base cover removed to show the driving chain and other related parts, Figures 2 and 3 are views taken substantially on the lines 2—2 and 3—3 of Figure 1, Figure 4 shows in enlarged form a portion of the apparatus of Figure 2 but with certain parts thereof in different relative positions, Figure 5 is a perspective view showing details of the pointer and a portion of its attached actuating mechanism,

2

Figure 6 is a view similar to the view shown in Figure 1 but of a modified structure, Figure 7 is a sectional view taken substantially on the line 7—7 of Figure 6, Figure 8 is a perspective view of a portion of the electrical insulated toothed contact members shown in Figure 6 for effecting a recurrent energization of the associated solenoid, and Figure 9 is an electrical circuit diagram showing the manner in which the solenoid 101 is adapted to be energized.

The apparatus shown in Figures 1-5 is a unitary structure with a base 10 having mounted thereon a sheet music supporting structure 11 for supporting the sheet music 12 in aligned relationship with the series of four pointers 14, 15, 16, 17 which are caused to scan corresponding lines 12A, 12B, 12C and 12D of the music printed on sheet 12. One of the characteristic features of the present invention is that these pointers 14, 15, 16 and 17 are caused to bob, i. e., move vertical simultaneously as they scan the printed music, i. e., move horizontally. Such bobbing of the pointers 14, 15, 16 and 17 in the arrangement shown in Figures 1-5 is produced mechanically, whereas electrical solenoid operated means are used for the same purpose in the arrangement shown in Figures 6-9 inclusive.

Each of these pointers 14, 15, 16 and 17 are mounted as shown in Figure 5 on a vertical rod (corresponding to rod 14A) which is slidably mounted in the vertically extending tube (corresponding to the tube 14B), the lower end of such tube being affixed to a corresponding traveling plate 14C, 15C, 16C and 17C, which are affixed by means of bolts 20 to an endless chain 21 at spaced intervals therealong. The particular manner of attachment of these traveling carriage plates is perhaps best seen in Figure 3, wherein a pair of metal angle plates 22, 23 have one of their legs apertured to receive the bolts 20 and the other one of their legs apertured to receive the rivet pin 24 passing through a cylindrical apertured portion of the chain 21.

The pointer rods associated with each one of the pointers 14, 15, 16 and 17, as exemplified by the rod 14A in Figure 5, are pin connected at each of their lower ends to an associated pivoted cam member 14D, 15D, 16D and 17D. These cams are pin connected to their respective plates 14C, 15C, 16C and 17C and cooperate with a stationary rack 26 mounted on the base 10, these pivoted cams being spring urged downwardly in cooperating engagement with the rack 26 by corresponding coil compression springs as represented by the coil compression springs 15E and 16E in Figure 1. It is observed that these springs have one of their ends abutting the corresponding cams 15D, 16D and their other ends abutting a portion of plates 15C, 16C, respectively.

In order to prevent undue movement of the associated traveling plates 14C, 15C, 16C, 17C while the corresponding cam moves over the rack 26, there is provided a track 27 in the form of a flat horizontal bar tapered at its opposite ends and stationarily supported by means of bolts 28 on the spaced U-shaped bracket members 40, 41. The horizontal parallel edges of this track 27 cooperate with a pair of small rollers 29 rotatably mounted on the corresponding plate as represented by the plate 16C in Figure 3. The pointers move from left to right in Figure 1, and desirably the leading end of the track 27 is tapered as indicated at 27A to take care of any mechanical misalignment, in which case this tapered end 27A serves to cam the plate moving into engagement therewith into a centered position.

It is observed that the rack 26 extends horizontally a distance substantially equal to the length of a line of printed music, and is disposed below the same so as to impart a bobbing movement to the pointers when and as the corresponding pointer travels adjacent the printed lines in its scanning movement.

The endless chain 21 travels over a pair of spaced supporting sprocket wheels 30, 31, the wheel 30 being merely an idler wheel but supported in the associated bearing 32 mounted on the base 10 for rotation about a vertical axis. The other wheel 31 is the driving wheel and is supported on the axle 34 which has its opposite ends journaled for rotation about a vertical axis in the bearings 36, 37 mounted respectively on the top stationary plate 38 and on the base plate 10. The top plate 38 is supported on the base plate 10 by means of the spaced U-shaped brackets 40, 41.

The shaft 34 has mounted thereon the gear 42 associated with a disengageable worm gear 43 driven by a motor-gearbox assembly enclosed within the housing 44. This housing 44 is mounted for pivotal movement about the pivot pin 45 mounted on the base plate 10 and is biased upwardly in Figure 2 by the coil tension spring 47 having one of its ends affixed to such housing 44 and the other one of its ends affixed to the stationary bracket member 41, whereby the worm gear 43 is biased thereby into cooperating engagement with the gear 42 on shaft 34 to effect driving of the same.

In order to disestablish the driving connection between worm gear 43 and gear 42, a manually operable handle 48 extending up above the top plate 38 is provide to cause the housing 44 to pivot about its pivot pin 45 carrying with it the worm gear 43 extending outwardly from such housing. For this purpose the handle 48 is pivotally mounted by means of pivot pin 50 on the top plate 38 and has an apertured crank arm 51 extending therefrom for receiving one end of a link 52, the other end of the link 52 being affixed to the housing 44 so that when the handle 48 is turned clockwise in Figure 2 the worm gear 43 is moved out of engagement with its associated gear 42.

While the worm gear 43 is thus held out of engagement with the gear 42 the shaft 34 may be turned manually by turning the knob 53 mounted on the shaft 34, whereby any one of the pointers 14, 15, 16 and 17 may be manually moved into a desired position with respect to the sheet of music 12.

It is observed that the rack 26 comprises generally a toothed member with the "pitch" of the toothed portions being equal to the musical beats, so that the pointers are moved upwardly and downwardly in one "upbeat" and "downbeat" of the music printed on sheet 12. In such case the initial upward movement of the pointer corresponds to the "upbeat" and the subsequent downward movement of the pointer corresponds to the "downbeat." Such upward and downward movement of the pointers is, of course, simultaneous with its horizontal movement. Preferably the inclined edges forming the teeth on the rack 26 are made as steep as possible whereby such upward and downward movement of the pointers is abrupt. The mechanical arrangement shown in Figures 1 and 5 for producing such upward and downward movement of the indicating pointers, however, imposes limitations as to the steepness of the edges defining such toothed portions of the rack. For example, such inclined portions may not be vertical since in such case the cam member 16D would have no inclined surface on which to ride upwardly. For that reason the arrangement shown in Figures 6–9 is preferred, inasmuch as the corresponding rack 126 (Figure 6) may have square teeth instead of trapezoidal shaped teeth as shown in Figure 1.

In the arrangement shown in Figures 6–9 the structure is identical as described above in connection with Figures 1–5, but instead of the pointers being bobbed by a mechanical cam and rack arrangement, the pointers are bobbed by energizing an associated solenoid. Thus, the corresponding parts in the various figures shown herein have identical reference numerals.

Referring to Figure 7, it is observed that the pointer rods, as exemplified by the rod 16A, instead of being linked to a pivoted cam (such as the cam 16D in Figure 1) the rod 16A in Figure 7 has mounted thereon a magnetic core 100 disposed within the solenoid winding 101, such winding 101 being secured to the plate 16C of insulating material by means of bolts 102 and bracket 103. The plate 16C is secured to the chain 21 in the same manner as shown in Figure 3, namely, by providing the angle pieces 22, 23 with apertured portions in each one of their legs through which the fastening bolts 102 and rivet 24 pass.

Also mounted on the traveling plate, as exemplified by plate 16C, is the electrical spring contact 104 arranged to cooperate with the square shaped teeth on the insulated rack member 126, the contact 104 and rack 126 thus serving as a circuit interrupter or switch for periodically making and breaking the electrical circuit when and as the plate 16C moves in a horizontal direction.

A similar spring contact member 105 (Figure 7) also mounted on the plate 16C is adapted to cooperate with the pair of identical and staggered contact members 106, 107. The contact member 105 cooperates with the first contact member 106, in the form of a rack, to provide one switch 105, 106, and similarly the same contact member 105 cooperates with the other contact member 107, also in the form of a rack, to provide a second switch 105, 107. For the present purpose, the switch 104, 126 is of significance and is serially connected with the associated solenoid winding 101 to recurrently energize and deenergize the same. When the solenoid winding 101 is energized, of course, the core member 100 is moved upwardly, and subsequently when the solenoid 101 is deenergized the core member 100 is allowed to fall by gravity and contact the bracket 103 to produce a desirable sound. Thus, when the contact member 104 initially engages one of the square teeth on the rack member 126, the solenoid winding 101 is energized, and this corresponds to the "upbeat." The indicator pointer remains at its elevated position while the contact member moves across the upper face of the square tooth, and when and after it leaves the trailing edge of the square tooth the switch 104, 126 is opened to thereby allow the pointer to drop in its "downbeat"; and at the end of the "downbeat" a sound is emitted when the core 101 strikes the ledge 103.

It is understood that the motor-gearbox assembly as represented at 44 in Figure 2 may take different forms and shapes, and the one shown herein is merely exemplary of those others which may be used in equivalent manner. It is also understood that the electric driving motor may have its speed varied or adjusted to increase or decrease speed of the chain 21 which it drives. Such motor speed control devices are well known in the art and may, for example, in those instances where the motor is a direct current type of motor, change the speed by changing the amount of current flowing through the field coils; or, in the case of an alternating current motor, speed changes may be effected by increasing or decreasing the amount of the voltage applied to the input terminals of the motor.

The space between the base plate 10 and upper plate 38 (Figure 7) may be enclosed by a decorative protective oval shaped casing 110, with an internal oval shaped flange 110A adapted to rest on the upper surface of the base plate 10.

While the switch 104, 126 is shown herein as a spring contact member moving in a substantially straight line over a plurality of square contact members disposed along the edge of the rack member 126, it is clear that the present invention is not limited to this specific type of switch. As a matter of fact, this switch may take other forms and shapes. For example, it may comprise a contact member mounted on either one of the sprockets 30, 31 arranged to pass over a series of relatively stationary contact members disposed on the arc of a circle.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a device of the character described, an indicator, means moving said indicator along substantially a horizontal line adjacent lines of printed music to scan the same, and means actuated upon operation of the first mentioned means for imparting an up and down generally vertical movement to said indicator while being moved along said horizontal line.

2. In a device of the character described, an indicator movable generally in a horizontal direction to scan printed musical notes, means moving said indicator horizontally, said indicator being mounted for vertical movement on said means, a mechanical rack bar extending generally parallel with the path of movement of said indicator, said means having mounted thereon a cam member cooperatively associated with said rack and said indicator to produce a bobbing movement of said indicator upon operation of said means.

3. In a device of the character described, a base member having mounted thereon a holder for printed music, a pair of sprockets mounted on said base, a chain passing over said sprockets and being driven by one of said sprockets, a series of spaced members on said chain, said members being spaced a distance substantially equal to the length of a line of music intended to be held by said holder, each of said members having an indicator mounted thereon for vertical movement, said indicators being movable in a generally horizontal direction, and means recurrently moving said indicators in a vertical direction in timed relationship with movement of said chain.

4. In a device of the character described, music scanning means, said scanning means being movable generally horizontally, an endless carrier mounting said scanning means for movement in a generally horizontal direction, an indicator mounted on said scanning means for movement in a generally vertical direction, and means recurrently moving said indicator in a vertical direction in timed relationship with movement of said endless carrier.

5. The invention defined in claim 4 characterized by the fact that the last mentioned means comprises a horizontally extending rack with a cooperating pawl, said pawl being connected to said indicator.

6. The invention defined in claim 4 characterized by the fact that said last mentioned means comprises a solenoid actuated mechanism energized recurrently in timed relationship with movement of said endless carrier to impart a recurrent vertical movement to said indicator.

7. In a device of the character described: scanning means, said scanning means being movable generally horizontally, means mounting said scanning means for movement in a generally horizontal direction, an indicator mounted on said scanning means for movement in a generally vertical direction, and means recurrently moving said indicator in a vertical direction in timed relationship with movement of said mounting means.

8. In a device of the character described, an indicator movable generally in a horizontal direction to produce scanning movement, first means moving said indicator horizontally, said indicator being mounted for vertical movement on said first means, second means extending generally parallel with the path of movement of said indicator, said second means having mounted thereon third means cooperatively associated with said second means and said indicator to produce a bobbing movement of said indicator upon operation of said first means.

9. The arrangement set forth in claim 6 in which said indicator comprises a pointer mounted on a rod which slides in a vertical tube, said vertical tube being moved horizontally with said scanning means.

PHILIP D. MOORE.
JOSEPH F. WILLIAMS.

REFERENCES CITED

The following references are of record in the file of this patent:

UNITED STATES PATENTS

| Number | Name | Date |
| --- | --- | --- |
| 607,789 | Gerandal | July 19, 1898 |
| 825,902 | Gomme | July 17, 1906 |